United States Patent [19]

Kraver

[11] 4,214,147

[45] Jul. 22, 1980

[54] ELECTRIC HEATING SYSTEM FOR CONTROLLING TEMPERATURE OF PIPES TO PREVENT FREEZING AND CONDENSATION

[76] Inventor: Richard A. Kraver, 8111 NW. 54th St., Miami, Fla. 33166

[21] Appl. No.: 916,734

[22] Filed: Jun. 19, 1978

[51] Int. Cl.$^2$ .................. F16L 53/00; F24H 1/12; H05B 3/58
[52] U.S. Cl. .................................. 219/301; 137/341; 138/33; 138/111; 138/148; 138/151; 219/535
[58] Field of Search .................. 219/301, 535, 528; 137/341; 138/33, 140, 147–149, 151–153, 32, 111; 239/133–137; 338/212, 214; 222/146 HE

[56] References Cited

U.S. PATENT DOCUMENTS

| | | | |
|---|---|---|---|
| 2,585,443 | 2/1952 | Cox | 338/212 |
| 2,707,095 | 4/1955 | Parsons | 138/148 X |
| 3,125,657 | 3/1964 | Colten | 219/535 |
| 3,275,803 | 9/1966 | True | 219/301 X |
| 3,548,158 | 12/1970 | McCaskill | 219/301 X |
| 3,782,452 | 1/1974 | Ceplon | 219/301 X |
| 3,908,705 | 9/1975 | Botsolas | 138/149 |
| 4,066,870 | 1/1978 | Colten | 219/528 |

FOREIGN PATENT DOCUMENTS

| | | | |
|---|---|---|---|
| 47976 | 11/1933 | Denmark | 138/148 |
| 1166668 | 6/1958 | France | 138/148 |
| 94723 | 8/1959 | Norway | 219/301 |
| 223373 | 12/1942 | Switzerland | 138/148 |
| 823799 | 11/1959 | United Kingdom | 219/301 |

*Primary Examiner*—A. Bartis
*Attorney, Agent, or Firm*—Alfred H. Rosen

[57] ABSTRACT

A tubular enclosure for a pipe which provides air-blanket insulation around the pipe, and an electric heater cable in the enclosure running along the underside of horizontal lengths of the pipe, cooperate in a system to prevent condensation of moisture on the pipe, loss of heat from a hot liquid in the pipe, and, with the benefit of convection in the air-blanket, heat around the pipe from the heater cable, to prevent freezing of the liquid.

The tubular enclosure has thin walls of substantially uniform thickness which are corrugated in the direction of the tubular longitudinal axis to provide an array of axially spaced circumferential air cells around the pipe. The innermost diameter of the corrugated enclosure walls is larger than the outer diameter of the pipe to provide space between the enclosure and pipe for the heater cable. The corrugations render the enclosure freely flexible transversely to its longitudinal axis for following the pipe around curves. The enclosure is slit longitudinally to its tubular axis across the corrugations for permitting it to be fitted to an existing water pipe installation.

5 Claims, 7 Drawing Figures

ELECTRIC HEATING SYSTEM FOR CONTROLLING TEMPERATURE OF PIPES TO PREVENT FREEZING AND CONDENSATION

BACKGROUND OF THE INVENTION

In so-called temperate climates, where the ambient temperature and humidity can vary between wide limits, pipes carrying water are subjected to conditions at various times that can cause sweating, loss of heat if the water has been heated, and freezing of the water. This invention relates to the entire spectrum of such problems and in particular provides a pipe covering and heating system which is low in cost, easy to install, uses components that are readily available, and minimizes use of materials that are difficult to work with or are in critical supply. The system of the invention when installed on a waterpipe constantly inhibits sweating and minimizes loss of heat from hot water, and optionally provides heating means to prevent freezing of water in the pipe; in the latter function it makes maximum use of pipe heating devices in a manner which, as a practical matter, has not up to now been available to consumers.

THE PRIOR ART

An early example of the application of electrical resistance heaters to heat a liquid passing through a hose is described in U.S. Pat. No. 1,809,714 granted June 9, 1931 to Mathews. The heater element is a coil embedded in the walls of the hose. A good deal of attention has been given to electrical heating cables in the form of a tape intended to be wrapped around a pipe, as is seen in U.S. Pat. Nos. 3,305,668—Smith; 3,851,149—Daley; 4,025,755—Shirley/DePhillips; and, 4,066,870—Colten. Obviously, it is not enough merely to wrap a heater cable around a pipe, for the heat provided will be partly lost away from the pipe unless an insulator is also provided. The practice in using such tapes is to wrap an insulator, customarily a fiberglass belt or tape, around the cable, after the cable has been installed. That practice uses insulating materials (e.g.: fiberglass) that are better used for other purposes, such as house insulation, and requires a duplication of labor to install the insulator around the pipe after installing the heater cable. If it is intended also to inhibit sweating, which can become increasingly undesirable if moisture is allowed to condense on the pipe and then seep into the insulation, a vapor barrier must be provided around the insulation, at added cost and possibly also added labor.

These existing deficiencies in the art are indicative of a lack of systematic approach to solving the full spectrum of problems mentioned above, the consequences of which are that the consumer is presently able to purchase only individual components, namely, heater cables, insulating materials and moisture barrier materials, expend more labor to solve the problems than is necessary, assuming that the consumer has the skills required to handle these various materials properly, and spend more money than should be necessary to achieve the solutions that are so obviously desirable. Furthermore, the techniques that are recommended for installing heater cables by the manufacturers and sellers of those cables, namely, to wrap the cables around a pipe, are clearly wasteful, as is illustrated in FIG. 1 of the accompanying drawing. It should be readily accepted that a given length of heater cable would go further if it were laid along a pipe rather than wrapped or coiled around it.

Pipe heating systems which do exist in the art appear to be so complex that the ordinary consumer cannot be expected to use them. U.S. Pat. Nos. 3,214,571—Indoe; 3,275,803—True; 3,354,292 and 3,398,262—Kahn; and 3,519,023—Burns/Simmons are examples. In Indoe, a pair of wires each individually insulated are held together and contained in an outer metallic sheath (26), and that assembly is fastened along the outside of a pipe in a matrix of heat transfer cement (column 3, lines 56-61). The disclosure does not suggest how to prevent loss of heat outwardly of the pipe, through the heat transfer cement. In True, a supporting wire coil (10) is the base on which a heat tape (11) is wound and covered with an insulator (13, Fiberglass is suggested). The end-product is a tubular assembly which must be slipped over the end of the pipe, to put it into use (column 2, lines 47-52). It is not readily apparent how this device could be used by a person seeking to cover waterpipes that are already installed.

The Kahn patents are concerned with a special tape in which current flows across the short dimension of the heaters (13a, 13b). Kahn makes particular mention that arrangements of the prior art in which heatng elements are enveloped in a thermal insulating material have a "disadvantage" in that the heating elements create longitudinal air gaps between the pipe and the insulating material ('292, column 1, lines 55-61; '262, column 1, lines 47-54), and he describes a complex insulating structure that is shown in FIG. 1 of each patent. The patent of Burns, Sr., and Simmons shows a collar in two parts connected together with a hinge, incorporating a heater (15) in the walls of the collar; this structure is a defrosting collar, for defrosting pipes to thaw liquids within the pipes.

SUMMARY OF THE INVENTION

This invention provides a novel condensation and temperature control system for pipes carrying water or other liquids. In the situation when cold water is carried in an ambient environment that is humid, this system will prevent moisture from condensing on the pipe—that is, it will stop the pipes from sweating. In the situation where hot water is being carried, it will conserve heat. In the situation where a pipe is subjected to freezing ambient temperatures, this system will provide heat to prevent freezing of water in the pipe, and will conserve that heat while applying it with improved efficiency. Generally, the system of the invention comprises two parts in combination which can be fitted to a pipe easily and quickly without requiring the use of tools or any special skill in handling each of the parts. One part is a corrugated conduit which is slit along one side in the axial direction, and the other part is an electrical heater tape of a kind that is available on the consumer market with instructions for wrapping it around a pipe to prevent freezing of water in the pipe. In accordance with the invention, the corrugated conduit encloses the pipe, and the heater tape is held in place adjacent the pipe within the conduit extending lengthwise along the pipe. The conduit is made of a substantially non-porous material which normally forms a substantially hard shell, but which owing to the corrugations is flexible enough to be bent axially on a short radius; preferably a plastic material such as polyethylene is used to form the conduit, for its utility at high and low temperatures outside the temperature range normally encountered in domestic usages, and for its flame-retardant properties. When the conduit is installed on a pipe, the corrugations provide air cells surrounding the pipe. With the heater tape installed preferably in the bottom of the conduit, under a pipe that is enclosed by the conduit, this system will shield the pipe from moist air thereby preventing sweating, insulate the pipe from loss of heat with its air cells surrounding the pipe, and provide circulation of warmed air from the tape around the pipe in the air cells when the heater tape is in use. The system of the present invention deliberately provides an axial series of air cells enclosing the pipe, and used those air cells in a novel combination that is able to prevent sweating, conserve heat and prevent freezing. As sold to a consumer, the heater tape is preferably installed within the corrugated conduit, extending lengthwise from one end of the conduit to the other. The consumer needs only to fit the conduit over the pipe in a single step which will simultaneously enclose the pipe and hold the heater tape in position to furnish heat, when called upon to do so. The assembly of conduit-and-tape is highly flexible, making it easy to provide a desired length (e.g.: 18 feet) in a compact box. An exemplary system according to the invention is described in connection with the drawings accompanying this application.

DETAILED DESCRIPTION OF THE INVENTION

Figure 1:
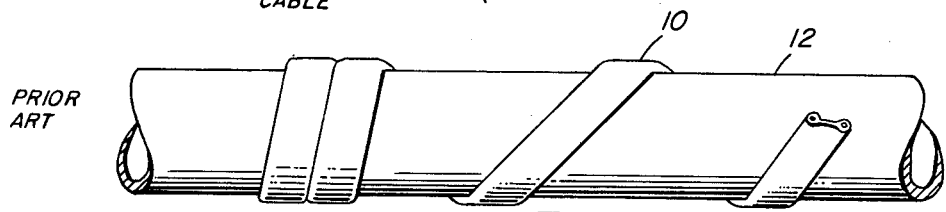
FIG. 1 illustrates a prior-art mode of applying an electrical heater tape to a water pipe.

FIG. 1 shows a heater tape 10 wrapped around a pipe 12, in the manner that has been customarily recommended up to now. The heater tape is commercially available from many sources. Examples are shown in U.S. Pat. Nos. 3,851,149; 4,025,755; and 4,066,870, each of which advises a user that it is a resistance heater cable adapted to be wrapped or coiled around water pipes. The embodiments of the present invention that are illustrated in the drawings are, for convenience, shown using a commercially available heating cable as illustrated in U.S. Pat. No. 3,851,149.

Figure 2:
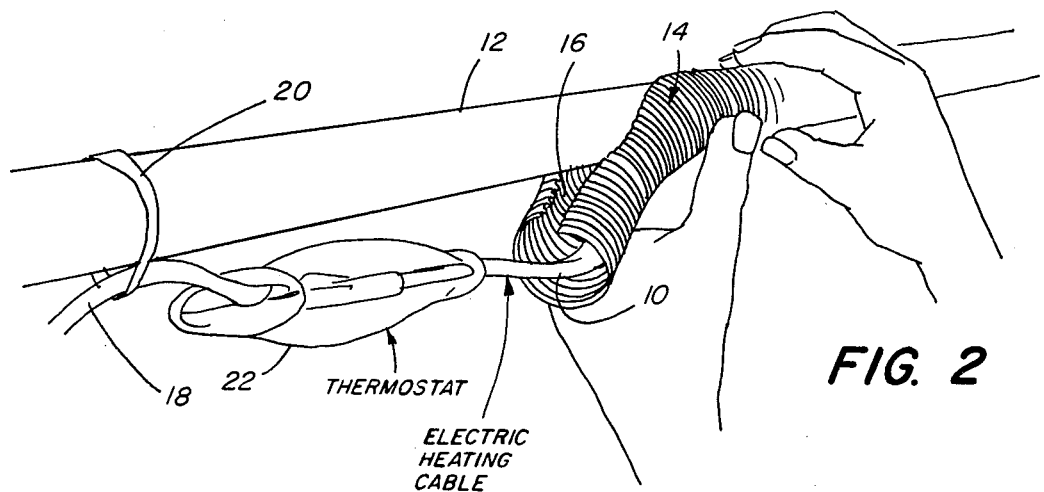
FIG. 2 illustrates installation of a system of the invention on a water pipe.

In FIG. 2, a corrugated tubular conduit 14, which is slit open along one side in the axial direction, is shown being fitted over the pipe 12, the slit 16 being open to receive the pipe. The tube 14 is corrugated annularly or helically, as desired, and in either case the tube is highly flexible in directions transverse to its longitudinal axis. An electrical heater cable, in the form of a tape 10 (it may be the cable that is shown in FIG. 1) is stretched along the pipe, in the bottom of the conduit 14, and the cold lead 18 may be held to the pipe with a band 20, for convenience in making the installation. As will be appreciated from FIG. 2, the conduit 14 can be fitted over the pipe by opening the slit 16 at one end of the conduit and placing that end over the pipe, and then fitting the conduit over the pipe progressively from that end to the other. The heater cable 10 is first laid in the conduit and as the conduit is fitted over the pipe the cable comes into place in the bottom of the conduit adjacent the pipe. The cable thermostat and test mechanism 22, and indicator lamp 24 when used, are outside the conduit.

Figure 7:
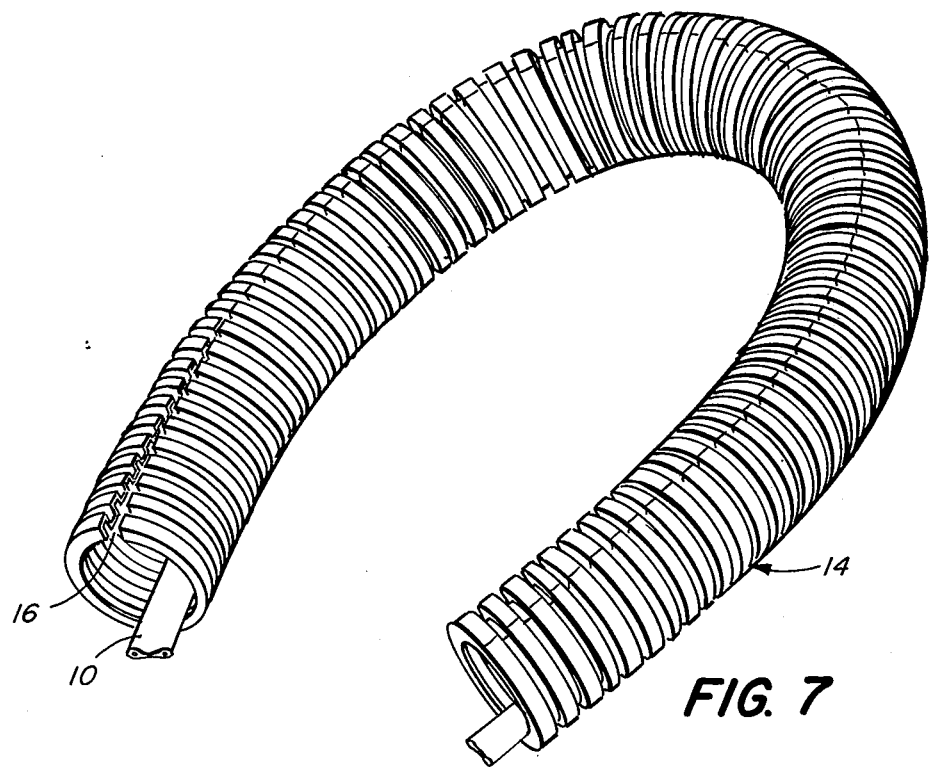
FIG. 7 is a longitudinal section of a convoluted conduit with heater cable in it, showing the parts in combination as sold to a consumer.

FIG. 7 shows a section of the tube 14 and tape 10 within the tube, forming a preferred assembly that is sold to the consumer. This subassembly is highly flexible, and can be coiled or folded into a small space, enabling a convenient length of it (e.g.: 12 or 18 feet) to be provided in a box or other container of convenient size, for example, approximately one foot square and about four inches deep. When the tube-and-tape subassembly is provided in this form, it can be installed on a pipe simply by opening the slit 16 at one end, and fitting it over a pipe progressively from one end to the other, as shown in FIG. 2. The tube snaps closed over the pipe as it is pushed over the pipe to enclose it, and the heater tape remains in the tube, adjacent the pipe.

Figure 5:
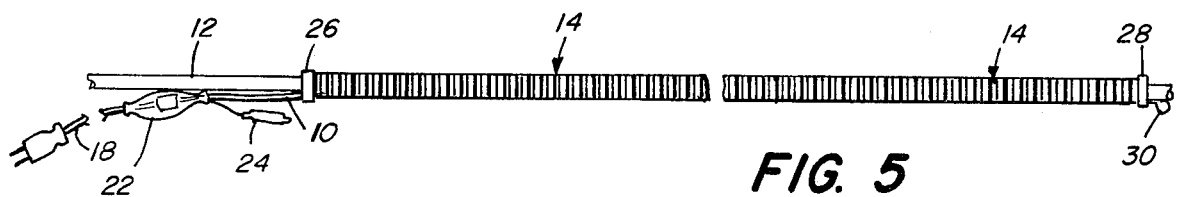
FIG. 5 is a longitudinal view showing the ends of a complete installation.

A completed installation is shown in FIG. 5. Each end of the conduit 14 is fitted with a clamp or strap 26, 28. The thermal nipple 30 at the free end of the heater cable should be left exposed. The band 20 shown in FIG. 2 may be removed from the completed installation, as shown in FIG. 5, or it may be allowed to remain, depending on whether or not the user wants the thermostat 22 to be closely adjacent the pipe 12.

Figure 3:
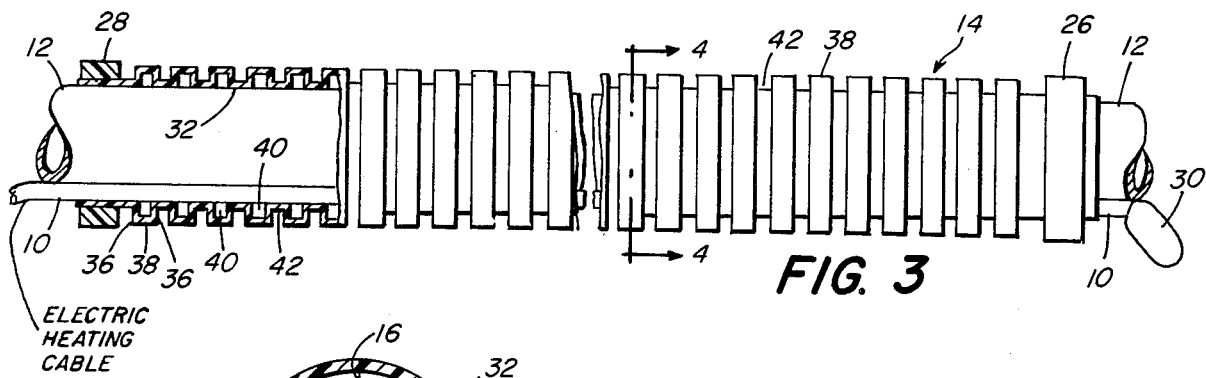
FIG. 3 is a longitudinal view, partly in section, of a system of the invention installed on a water pipe.
Figure 4:
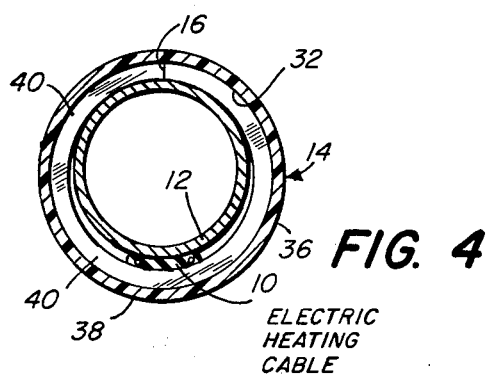
FIG. 4 is a section on line 4—4 of FIG. 3.

The conduit 14 is made of a material, such as polyethylene, which forms a hard shell 32, as is seen in the sectional portions of FIGS. 3 and 4. The shell is corrugated; the corrugations follow a circumferential path around the tubular longitudinal axis of the conduit. The cross-section of the illustrated corrugations is substantially rectangular, each corrugation having side walls 36 and a top wall 38 bridging them, to form an air cell 40 of rectangular cross-section extending circumferentially around the pipe 12. Adjacent corrugations are joined by the conduit wall portions 42 between their "bottoms"; that is, the top wall portions 38 are curved on a radius that is larger than the conduit—joining wall portions 42.

While the shell 32 may have sufficient rigidity to close the conduit 14 around the pipe 12 (provided the pipe is sufficiently small in diameter to fit within the conduit when the slit 16 is closed) the corrugated form adds restoring force tending to close the slit 16 and hold the conduit on the pipe, with the slit preferably on top, as is shown in FIG. 4. At the same time, the corrugated form contributes a high degree of bending flexibility to the conduit, so that it can be flexed transverse to the tubular longitudinal axis, not only for ease in installation and packaging as is apparent in FIGS. 2 and 7, but also to allow the conduit to follow a pipe around curves and bends. This latter capability enables the heater cable or tape 10 to be carried around curves and bends without the need to wrap it around a pipe, which is a vastly simplified installation procedure, and more economical, compared with the prior art.

FIG. 4 shows how the conduit 14 acts to close the slit 16 on a pipe 12 which fits comfortably within the conduit. The heater cable 10 is shown resting within the conduit, preferably at the bottom under the pipe 12. The air cell 40 extends from the heater cable upward and around the pipe, and is ideally suited to carry heat by convection from the heater cable to the side and upper walls of the pipe. There is no need to fit the conduit tightly around the pipe. It will provide a blanket of air, and there will be no need to add any other insulation to cooperate with the heater cable for protecting the contents of the pipe from freezing.

Figure 6:
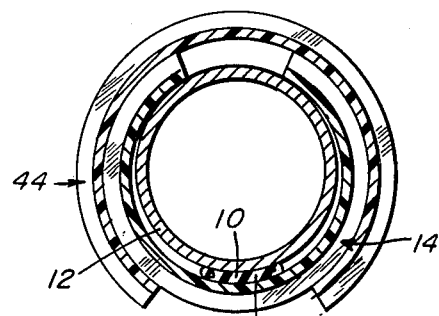
FIG. 6 is a sectional view, like FIG. 4, of another embodiment of the invention.

In the case where a conduit 14 is too small in diameter to close around a pipe on which it is intended to install it, two conduits may be used, as is illustrated in FIG. 6. The first conduit 14 may be installed as in FIGS. 2–4, inclusive, with the heater cable 10 under the pipe 12, but with the slit 16 open to expose a longitudinal sector of the pipe 12. A second conduit 44 is installed over the first conduit, covering the slit 16 in the first conduit, and partially overlapping the first conduit.

While the air cells 40 have been illustrated as being substantially rectangular in cross-section, the invention is not limited to that form of corrugation. Also, while the invention takes advantage of the restoring force present in the conduit to maintain the slit 16 closed, auxiliary closing devices such as clamps or tying devices, for example, may be used, if desired.

The scope of the invention is defined in the claims that follow. The foregoing disclosure serves only to illustrate presently-preferred embodiments which represent the best mode now known to practice the invention.

I claim:

1. A condensation and temperature control system for a pipe carrying a liquid, comprising in combination when installed on the pipe a tubular enclosure for the pipe and an elongated electrical heater in the enclosure adjacent the pipe, the enclosure having walls of substantially uniform thickness and that are substantially non-pervious to moisture said walls being corrugated in the direction of the tubular longitudinal axis so as to provide a series of axially-displaced air-cell spaces extending circumferentially around the pipe, the innermost diameter of said walls being larger than the outer diameter of the pipe to provide space between said tubular enclosure and said pipe for said heater, the heater being located to heat air in the air cells and by movement of such heated air in said air cells to warm the pipe for preventing freezing of liquid in the pipe, the corrugations rendering the tubular enclosure freely flexible transversely to its longitudinal axis for following a pipe around curves.

2. A system according to claim 1 in which said walls are made of a corrugated polyethylene shell.

3. A system according to claim 1 in which said tubular enclosure has a longitudinal slit running parallel to its tubular axis and across the corrugations in the walls of the enclosure, and the walls of said enclosure can be parted at the slit to enable the enclosure to be fitted over a pipe, the walls having a restoring force contributed by said corrugations which is oriented to close said slit.

4. In combination with a system according to claim 1, a pipe having a substantially horizontal run, said system being installed on the pipe with the heater under the pipe so as to warm the pipe by convection of said heated air in said air cells, the heater being elongated in the direction of the longitudinal axis of the pipe.

5. In combination with a system according to claim 3, a pipe having an external diameter which is smaller than the smallest internal diameter of said tubular enclosure when said slit is closed, said pipe having a substantially horizontal run, said heater being under the pipe in said horizontal run so as to warm the pipe by convection of said heated air in said air cells, the heater being elongated in the direction of the longitudinal axis of the pipe.

* * * * *